United States Patent [19]

Cloarec

[11] 4,338,038
[45] Jul. 6, 1982

[54] BALL-AND-SOCKET JOINT FOR MULTIARTICULATE ARM

[75] Inventor: Laurent Cloarec, Noisy-le-Roi, France

[73] Assignee: Regie Nationale des Usines Renault, Boulogne-Billancourt, France

[21] Appl. No.: 111,347

[22] Filed: Jan. 11, 1980

[30] Foreign Application Priority Data

Jan. 17, 1979 [FR] France ................. 79 01070

[51] Int. Cl.³ .................. F16C 11/06; F16C 11/00; F16D 1/12
[52] U.S. Cl. ........................ 403/56; 403/76; 403/142; 403/141
[58] Field of Search ............ 403/57, 56, 141, 142, 403/143, 76, 77; 64/7; 3/12.6, 12.7, 12.8; 414/735

[56] References Cited

U.S. PATENT DOCUMENTS

| 1,865,300 | 6/1932 | Bowen | 64/9 R |
| 3,490,798 | 1/1970 | Spyra | 403/143 X |
| 3,872,690 | 3/1975 | Salajczyk | 64/9 R |

Primary Examiner—Wayne L. Shedd
Attorney, Agent, or Firm—Oblon, Fisher, Spivak, McClelland & Maier

[57] ABSTRACT

A ball-and-socket joint for a multiarticulate arm includes two cylindrical bodies forming phalanges each ending in a pair of jaws which contact a hollow sphere limited by two parallel planes essentially equidistant from the center of the sphere, with the hollow central part of the cylindrical bodies and of the sphere serving as a passage for the device for synchronizing the movements of the phalanges.

6 Claims, 7 Drawing Figures

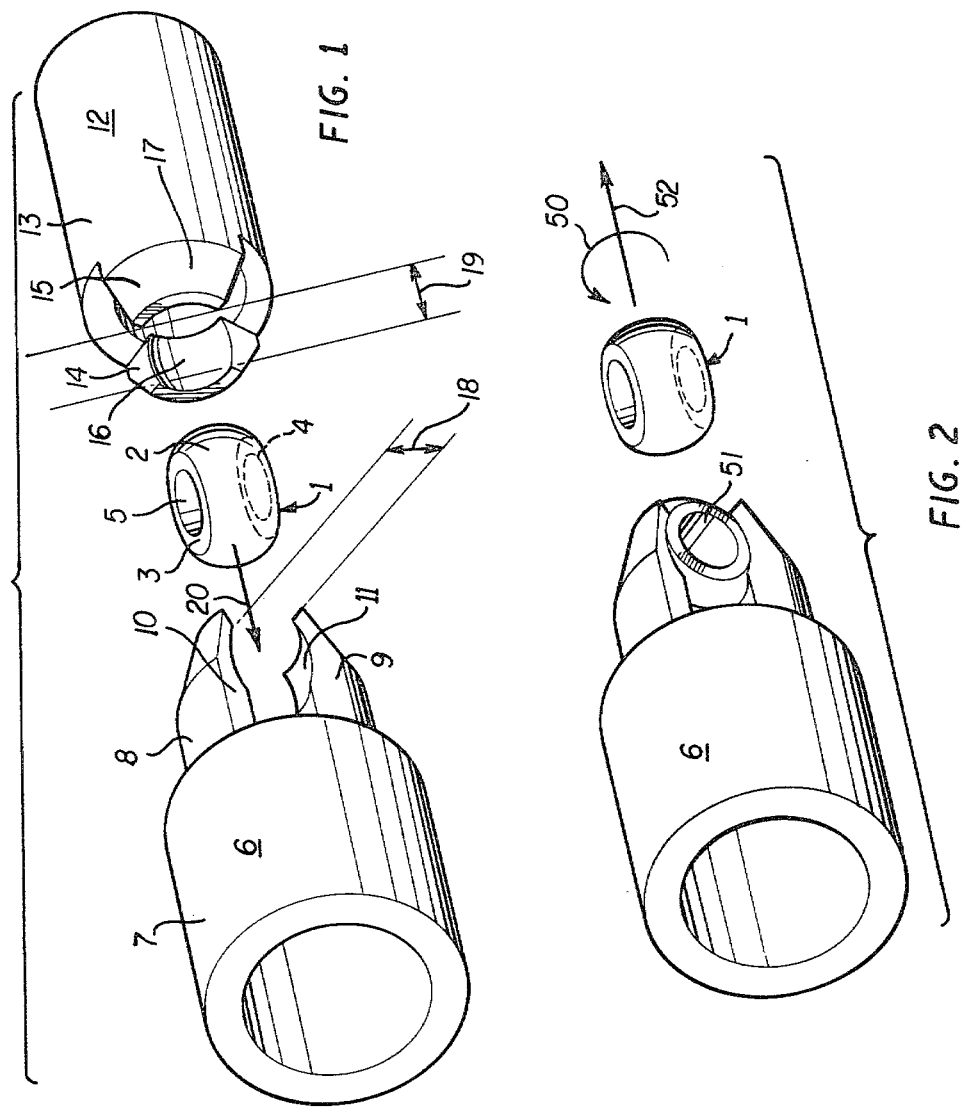

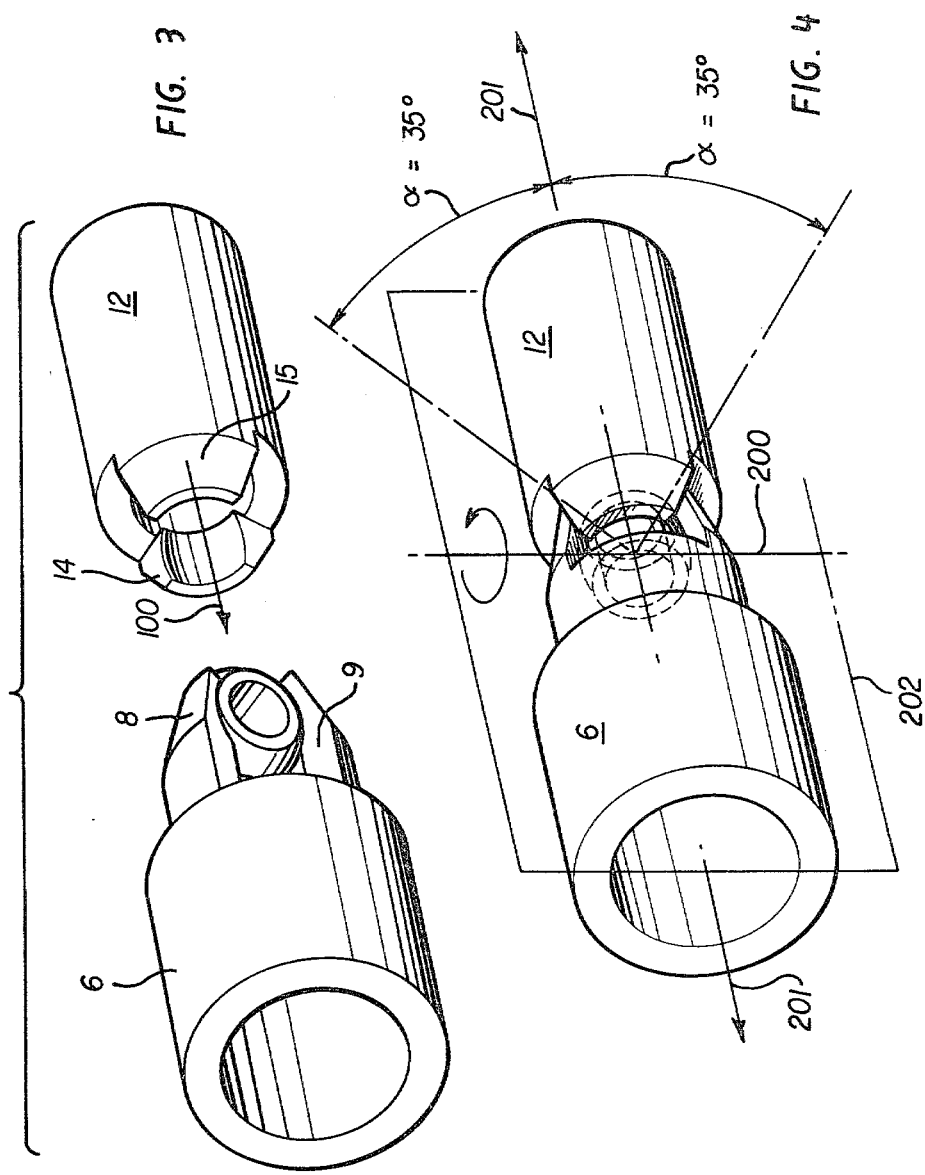

4,338,038

BALL-AND-SOCKET JOINT FOR MULTIARTICULATE ARM

BACKGROUND OF THE INVENTION

1. Field of the Invention:

This invention concerns a ball-and-socket joint system such as is used in jointed devices, particularly in multiarticulate arms.

2. Description of the Prior Art:

Multiarticulate arms are, for example, used in the construction of robots. If they include a great enough number of "phalanges", such arms enable simulation of mechanisms having distributed elasticity and/or deformation. Connected to other mechanisms, they thus enable construction of devices which are often called "probes" and which, when they are affixed at one of their ends, e.g., to a robot, and hold at their other end a tool such as a spot welder, drill, paint gun, etc., enable positioning the tool around an obstacle by turning it. With the help of such probes, large spaces within which work must be done may be entered through a relatively small-sized opening. Such a probe was described in French Pat. No. 77-02387 filed Jan. 28, 1977 for a "Multiarticulate arm for robot or automation." In the abovementioned patent, as in other patents in the same field, different types of ball-and-sockets are used. Some can be dislocated at any moment and, to prevent this, the elements making up the joint must be preloaded using springs. Such preloading increases internal friction and stress, thereby reducing the life of the ball-and-sockets while increasing the power necessary to operate them. For other types of ball-and-sockets, dislocation is prevented by crimping. This operation is very advantageous both from the point of view of wear and of required power, but it makes the device impossible or difficult to disassemble. Furthermore, reassembly usually requires changing the parts making up the ball-and-socket joints.

Also known are ball-and-sockets which cannot be disassembled when they are in normal operating position but which can be easily disassembled when the component parts are placed in a special position not reached during normal use. These ball-and-sockets have several important drawbacks which practically preclude their use in multiarticulate arms. These drawbacks flow essentially from the fact that such ball-and-socket joints are composed essentially of two parts. The first part is composed of a convex spherical element limited by two parallel planes disposed symmetrically on either side of the sphere's center. Such spherical element may be connected to a rod by means of a hole perpendicular to the two planes and passing through its center. The second element is composed of a concave bearing surface of the same radius as the preceding element, formed in a generally cylindrical piece the axis of which passes through the axis of the sphere.

To enable assembly of the two elements, the element with the concave sphere is equipped with a notch which allows the spherical element to move up to the point at which the centers of the two spheres are identical. This requires that the axis of revolution of the convex spherical element and that of the concave spherical element be perpendicular. The two elements can then be pivoted with relation to each other so as to bring the two axes into alignment. The two elements can then be moved with relation to each other in oscillating motions of limited height and rotational motions around their respective axes.

The fact that these ball-and-socket joints are composed of only two elements means that although the concave spherical element can be connected to a tubular "phalanx" of large diameter, the convex spherical element can be connected to a phalanx only by a central shaft of small diameter. In addition, this must be disassembled to allow assembly of the two elements of the ball-and-socket joint. Unfortunately, the construction of synchronized phalanx probes, such as those for which the instant invention is preferentially intended, requires that a system for inter-phalanx synchronization be passed through the center of said joints.

The small-diameter shaft required by the jointing system described above makes passage of such a synchronization system through its center practically impossible. It should be noted finally that the possibility of having ball-and-socket joint elements capable of performing rotations at any angles about their respective axes of revolution is of no use for the construction of multiarticulate arms having only two degrees of freedom enabling them to assume any curvature in any plane containing the axis common to all the phalanges when these are aligned.

SUMMARY OF THE INVENTION

The main object of the instant invention is to enable construction of a ball-and-socket joint having none of the flaws described above while retaining all useful features. The ball-and-socket joint will, in particular, comprise three elements, all of which can be of tubular configuration with a bore that is substantially equal in diameter to that of the sphere forming the ball-and-socket joint. Any useful device for synchronization of the "phalanges" may thus be passed through their center.

An advantage of the instant invention is the construction of a ball-and-socket joint device which is both easy and economical to produce while enabling rotations of limited but in any case sufficient amplitude about any axis passing through the center of the ball of the joint.

Another advantage of the instant invention is to enable construction of an easily assembled, and equally easily disassembled ball-and-socket joint which is nevertheless impossible to disassemble while in normal operating position.

Other advantages will appear from the following description. In addition, it is obvious that the use of such a ball-and-socket joint system cannot be limited to multiarticulate arms such as those used on robots and that any other use could not limit the scope of the instant invention.

BRIEF DESCRIPTION OF THE DRAWINGS

Various other objects, features and attendant advantages of the present invention will be more fully appreciated as the same becomes better understood with reference to the following detailed description when considered in connection with the accompanying drawings in which like reference characters designate like or corresponding parts throughout the several views, and wherein:

FIG. 1 represents the three elements of the joint according to the instant invention, separated from one another but in relative position for assembly;

FIG. 2 represents one of the sockets and the spherical element making up the ball-and-socket, with the latter shown in the position preceding assembly and in assembly position with the socket;

FIG. 3 represents one of the sockets in which the spherical element making up the ball-and-socket is assembled, with the second socket ready to be assembled;

FIG. 4 represents the completely assembled joint according to the invention;

DETAILED DESCRIPTION OF THE PREFERRED EMBODIMENT

Figure 5:
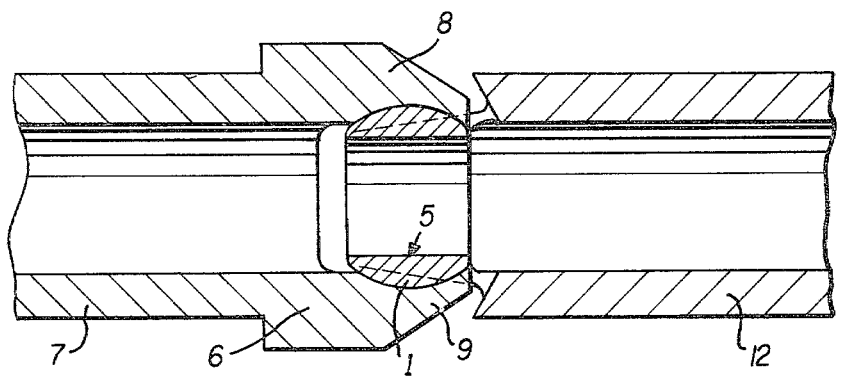
FIG. 5 represents an axial section of said joint in a plane containing the axes of the sockets when they are aligned.

With reference to FIG. 1, a convex spherical element 1 is shown formed by a spherical surface 2 of a piece which may be made of any rigid material having properties adapted to the use of stress received by the ball-and-socket joint. For example, element 1 may be made of sintered metal, steel, bronze or other; may be machined from metal or plastic, may be forged, etc. The quality of its surface state and its tolerances must also be compatible with the uses of the joint. Spherical surface 2 is limited by two parallel planes 3 and 4 which are essentially symmetrical with relation to the center of the sphere. The intersections of the spherical surface and of these planes thus forms two circles of closely related diameter. A bore 5 may be drilled perpendicularly to planes 3 and 4 in spherical element 1. The diameter of this bore may be as large as desired, up to a limit of the diameter of the smallest of the circles forming the intersections of planes 3 and 4 and spherical surface 2.

A first phalanx 6 is composed of a tubular element 7 having any desired diameter. However, the inner diameter shall be substantially equal to, or greater than, the diameter of the bore in spherical element 1. From tubular element 7 extends an element 8 and an element 9 forming a fork shaped like the jaws of a pair of pliers but made integral and rigid with respect to tubular element 7, with which they may moreover be of a piece. Elements 8 and 9 include concave spherical surfaces 10 and 11 having the same diameter as convex spherical surface 1 and forming a socket.

The width of "beaks" 8 and 9 is such that a second piece 12 which is exactly identical to piece 6 and likewise includes a tubular element 13 identical to 7 and two jaws 14 and 15, respectively identical to 8 and 9, including spherical surfaces 16 and 17, respectively identical to 10 and 11, may when turned 90° on its axis, have its jaws 14 and 15 engage around jaws 8 and 9 until the centers of their respective concave spheres meet. In this position, the two pieces 6 and 12 may pivot about any axis passing through the center of the spherical surface at an angle which is sufficient for the ball-and-socket to function satisfactorily. It will be seen that it would be impossible here to define the "width" of beaks 8, 9, 14 and 15 otherwise than functionally.

In reality, using a working drawing, it would be easy to define the limit shapes of the jaws in terms of the desired angles of rotation. In addition, these jaws are open at the end which meets the end of the opposite tubular element 7 or 13, and the width of this opening 18 or 19 respectively is at least equal to the distance between the two planes 3 and 4 limiting spherical surface 2, and is furthermore less than the diameter of the spherical surface 2. In this way, when spherical element 1 is in the position shown in FIG. 1 with respect to "phalanx" 6, it can be seen that by a simple translation in direction 20, spherical element 1 can be introduced into plier "jaws" 8 and 9 so that the centers of the convex and concave spherical surfaces coincide. Once this operation is done, rotation of which the representative vector is 50 in FIG. 2 brings piece 1 to position 51 between "jaws" 8 and 9. It will be seen that at this moment, a force acting in direction 52 between piece 1 and phalanx 6 can no longer separate the two pieces.

With piece 1 in position 51 of FIG. 2, a simple translation along 100 (FIG. 3) allows "jaws" 14 and 15 of phalanx 12 to come between and beside "jaws" 8 and 9 of phalanx 6 until the centers of spherical surfaces 16 and 17 are likewise coincidental with the center of spherical surfaces 2, 10 and 11. At this moment, piece 1 is simply turned 90° around axis 200 to bring bore 5 of spherical element 1 into coaxial position with the axes of tubular phalanges 6 and 12. It can be seen that at this point a force 201 operating on the two phalanges 6 and 12 and tending to separate them, or to push them together, will have no effect since spherical element 1 has locked 6 and 12 together so that the centers of spherical surfaces 10, 11, 16 and 17 are at all times coincidental, enabling limited, but sufficient, angular displacements about any axis passing through the center.

For a typical application of a multiarticulate arm, the system may be designed-particularly jaws 8, 9, 14 and 15-so that this angle may attain a value of 30° to 35° (FIG. 4). On the other hand, when the tubular elements are coaxial, the construction object of the invention does not enable great rotation around the common axis. This is desired, however, since for the preferential application mentioned, such a rotation is not necessary at all.

FIG. 5 also shows tubular element or phalanx 6 with jaws 8 and 9 cut by plane 202 of FIG. 4. Spherical element 1 is shown, along with tubular phalanx 12 with a view of jaw 14, the form of which is such that it enables "sufficient" rotation of the two phalanges with respect to each other.

FIG. 5 further shows the large-diameter bore freed up on the inside by the device according to the invention, enabling passage of devices for synchronization of the phalanges. Nevertheless, FIG. 5 reveals that the joint according to the invention retains one serious drawback which, however, is easy to remedy, as the following will show. In fact, the angular position of spherical element 1 is not defined. In use, therefore, it undergoes variations and it is obvious that it may at one point occupy a position in which dislocation of the joint would be possible, possibly entailing breakdown of the machine using the joint or at least a stop for repairs.

Figure 6:
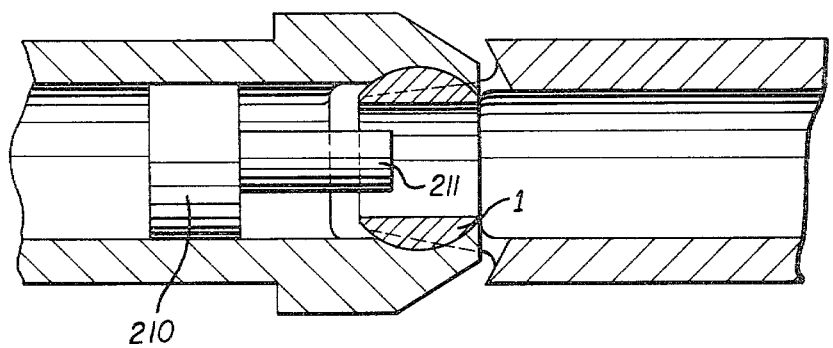
FIG. 6 represents an axial section of the joint including an element limiting the angular displacement of the spherical element making up the ball-and-socket with one of the sockets.

To prevent this, it is enough, for example, to prevent spherical element 1 from exceeding a certain angular position with respect to one of the two phalanges. This is carried out in FIG. 6 by disposing within tubular element 7 a stationary cylindrical piece 210, one end 211 of which is engaged within a central bore 5 of spherical element 1, preventing it from rotating to an angle greater than defined by the play between the diameter of extremity 211 of piece 210 and the diameter of bore 5.

A drawback introduced by piece 210 is that it blocks, at least partially (since it too may be tubular), the bore of the ball-and-socket joint device. When the entire bore is really needed for the phalanx synchronization device, the solution is even simpler: the phalanx synchronization device itself serves to limit rotation of spherical element 1. The angular limitation then costs nothing. It is enough to withdraw the synchronization element to be able to disassemble the two phalanges 6 and 12 after having pivoted spherical element 1 in the reverse direction from that used for assembly. Many other means-which have not been described-enabling limitation of the maximal angle of rotation will be seen by the man in the art and these cannot be considered as a new element of the instant invention.

Figure 7:
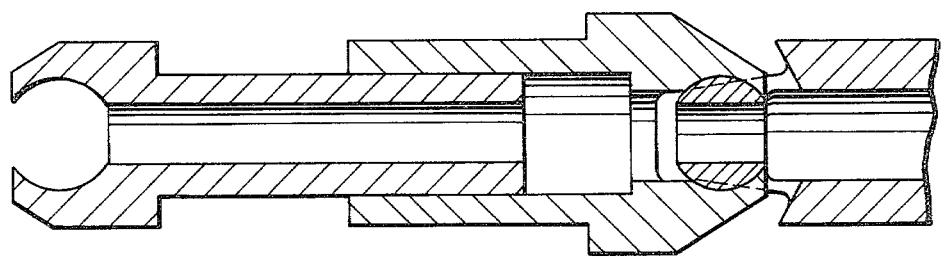
FIG. 7 represents a joint according to the invention, connected by means of a sliding link to the socket of a second joint assembly according to the invention.

Of course, each tubular element may have a ball-and-socket joint at each of its ends, thereby forming a multiarticulate arm having any number of ball-and-sockets. Similarly, a number of these tubular elements may receive in sliding assembly within their bore the tubular element of another ball-and-socket joint system, thus enabling variation where necessary of the distance between the centers of the spheres of two consecutive articulations as shown in FIG. 7.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ball-and-socket joint assembly for a disassemblable type multiarticulate arm, comprising:

a ball of a first predetermined diameter having a partially spherical shape limited by two parallel planar surfaces a first predetermined distance apart and equidistant from the center of said ball and having a center bore of a second smaller diameter perpendicular to said parallel planar surfaces;

first and second tubular elements, each having a fork formed by a pair of circumferentially curved arms extending parallel to the axis of said tubular elements from adjacent outer ends and meshing with each other so as to enclose said ball, wherein the distance between the extreme ends of said pair of curved arms is less than said first predetermined diameter and at least equal to said first distance; and each of said pair of curved arms including concave inner spherical surfaces forming a socket within which said ball is disposed, said concave inner spherical surfaces having a diameter corresponding to said first predetermined diameter such that the center of each of said concave inner spherical surfaces and the center of said ball coincide when assembled and said concave inner spherical surfaces of said pair of curved arms are elastically maintained in contact with said ball in opposition to longitudinal dislodging forces.

2. A ball-and-socket joint assembly for a multiarticulate arm according to claim 1, further comprising a third tubular element operatively associated with at least one of said first and second tubular elements at an end opposite said adjacent ends so as to form a second socket.

3. A ball-and-socket joint assembly for a multiarticulate arm according to claim 1, further comprising a sliding guide element slidably mounted within at least one of said first and second tubular elements and forming a second socket.

4. A ball-and-socket joint assembly for a multiarticulate arm according to claim 1, further comprising a cylindrical member mounted within at least one of said first and second tubular elements wherein said cylindrical member further comprises a nose portion positioned within said center bore of said ball so as to oppose rotation thereof.

5. A ball-and-socket joint assembly according to one of claims 1, 2, 3, or 4 wherein said ball-and-socket assembly comprises a multiarticulate arm for a robot.

6. A ball-and-socket joint assembly for a multiarticulate arm according to one of claims 1, 2, 3 or 4 wherein said ball-and-socket assembly comprises a multiarticulate arm for an automation.

* * * * *